(12) United States Patent
Joki et al.

(10) Patent No.: US 6,786,645 B2
(45) Date of Patent: Sep. 7, 2004

(54) MOUNTING FOR VEHICULAR ROAD WHEEL

(75) Inventors: Mark A. Joki, Dover, OH (US); James W. Skelly, Tegacay, SC (US); Richard Borowski, Canton, OH (US); Steven B. Boyd, Louisville, OH (US); Thomas J. Rybkoski, Uniontown, OH (US)

(73) Assignee: The Timken Company, Canton, OH (US)

( * ) Notice: Subject to any disclaimer, the term of this patent is extended or adjusted under 35 U.S.C. 154(b) by 71 days.

(21) Appl. No.: 10/298,761

(22) Filed: Nov. 18, 2002

(65) Prior Publication Data

US 2003/0094849 A1 May 22, 2003

Related U.S. Application Data

(60) Provisional application No. 60/350,679, filed on Jan. 22, 2002, and provisional application No. 60/331,889, filed on Nov. 21, 2001.

(51) Int. Cl.$^7$ .............................. F16C 33/80; F16C 19/38
(52) U.S. Cl. .................. 384/488; 384/480; 384/551; 384/589
(58) Field of Search ................. 384/571, 569, 384/477, 480, 488, 589, 584, 585, 551; 301/105.1, 111, 137, 124.1

(56) References Cited

U.S. PATENT DOCUMENTS

| | | | | |
|---|---|---|---|---|
| 5,090,778 A | * | 2/1992 | Laudszun et al. | 301/105.1 |
| 5,328,275 A | * | 7/1994 | Winn et al. | 384/472 |
| 5,992,943 A | * | 11/1999 | Sheets et al. | 301/105.1 |
| 6,203,206 B1 | * | 3/2001 | Dagh | 384/489 |
| 6,261,004 B1 | * | 7/2001 | Tsujimoto et al. | 384/571 |
| 6,283,639 B1 | * | 9/2001 | Rode | 384/551 |
| 6,502,996 B2 | * | 1/2003 | Joki | 384/571 |

* cited by examiner

*Primary Examiner*—Thomas R. Hannon
(74) *Attorney, Agent, or Firm*—Polster, Lieder, Woodruff & Lucchesi, L.C.

(57) ABSTRACT

A mounting for the road wheel of an automotive vehicle includes a spindle, a hub located around the spindle and inboard and outboard tapered roller bearings located between the hub and spindle where they are mounted in opposition. The cones (inner races) of the two bearings are separated by a spacer which at its ends is attached to the cones. The spacer holds the cones together within the hub so that the bearings and hub can be installed on and removed from the spindle as a unit. The spacer also establishes the setting for the bearings. In addition, the mounting has a seal located in the inboard end of the hub. The seal has lips which establish dynamic fluid barriers along the cone of the inboard bearing and along an adjacent sealing surface on the spindle without contacting the cone or spindle. The raceways and rollers for the two bearings have highly crowned profiles and the hub and the seal within contain an optimum amount of grease for lubricating the bearings.

33 Claims, 3 Drawing Sheets

MOUNTING FOR VEHICULAR ROAD WHEEL

CROSS REFERENCE TO RELATED APPLICATIONS

This application derives priority from U.S. provisional patent application Serial No. 60/331,889, filed Nov. 21, 2001, and U.S. provisional application Serial No. 60/350,679, filed Jan. 22, 2002.

STATEMENT REGARDING FEDERALLY SPONSORED RESEARCH OR DEVELOPMENT

None

BACKGROUND OF THE INVENTION

This invention relates in general to wheel mountings and more particularly to a mounting for the road wheel of an automotive vehicle.

The nondriven road wheels of many automotive vehicles rotate about spindles that are fixed in the sense that they do not rotate—although they may pivot for steering. Typically, a nondriven wheel on such a vehicle is attached to a hub which rotates about a spindle on a pair of antifriction bearings. The two bearings have rolling elements which roll along raceways that are angled with respect to the axis, so that one bearing takes thrust in one axial direction and the other in the opposite axial direction. Of course both transfer radial loads. Being mounted in opposition, the bearings lend themselves to adjustment between settings of endplay and preload. Typically, the setting is controlled with a nut that threads over the spindle and against the inner race for the outboard bearing, so that the nut controls the spacing between the inner races, often referred to as "cones", which are carried by the spindle. In endplay radial clearances exist with the bearings, and their presence reduces friction, but it may also induce wheel wobble which detracts from the stability of the vehicle and damages the inboard seal that protects the bearings. Preload on the other hand, eliminates wobble and thus improves stability, but preload increases friction. Too much preload can damage the bearings and produce excessive frictional losses. Ideally, the bearings should operate with a light preload.

Procedures currently utilized for setting wheel bearings lack precision. Often the setting is determined by the torque applied to the spindle nut or by monitoring the torque required to rotate the wheel that the bearings support. Both procedures can produce errors of significant magnitude. Aside from that, the nut is secured against rotation by a cotter pin which positions the nut only at in limited angular increments and thus further detracts from the precision desired for setting high performance bearings.

Finally, the bearings require seals between the hub and spindle to retain a lubricant within the interior of the hub and at the bearings and to exclude containments from the bearings. These seals possess contact lips which bear against the spindle and create drag.

Some high performance wheel bearings, such as those used on race cars, must operate with a minimum of friction and a high measure of stability. Conventional bearings for automotive wheel mountings do not possess these characteristics to the extent desired.

SUMMARY OF THE INVENTION

The present invention resides in a wheel mounting that includes a spindle, a hub surrounding the spindle, and a bearing between the hub and spindle to enable the hub to rotate on the spindle, and also a seal which establishes a dynamic fluid barrier between hub and spindle.

DETAILED DESCRIPTION OF INVENTION

Figure 1:
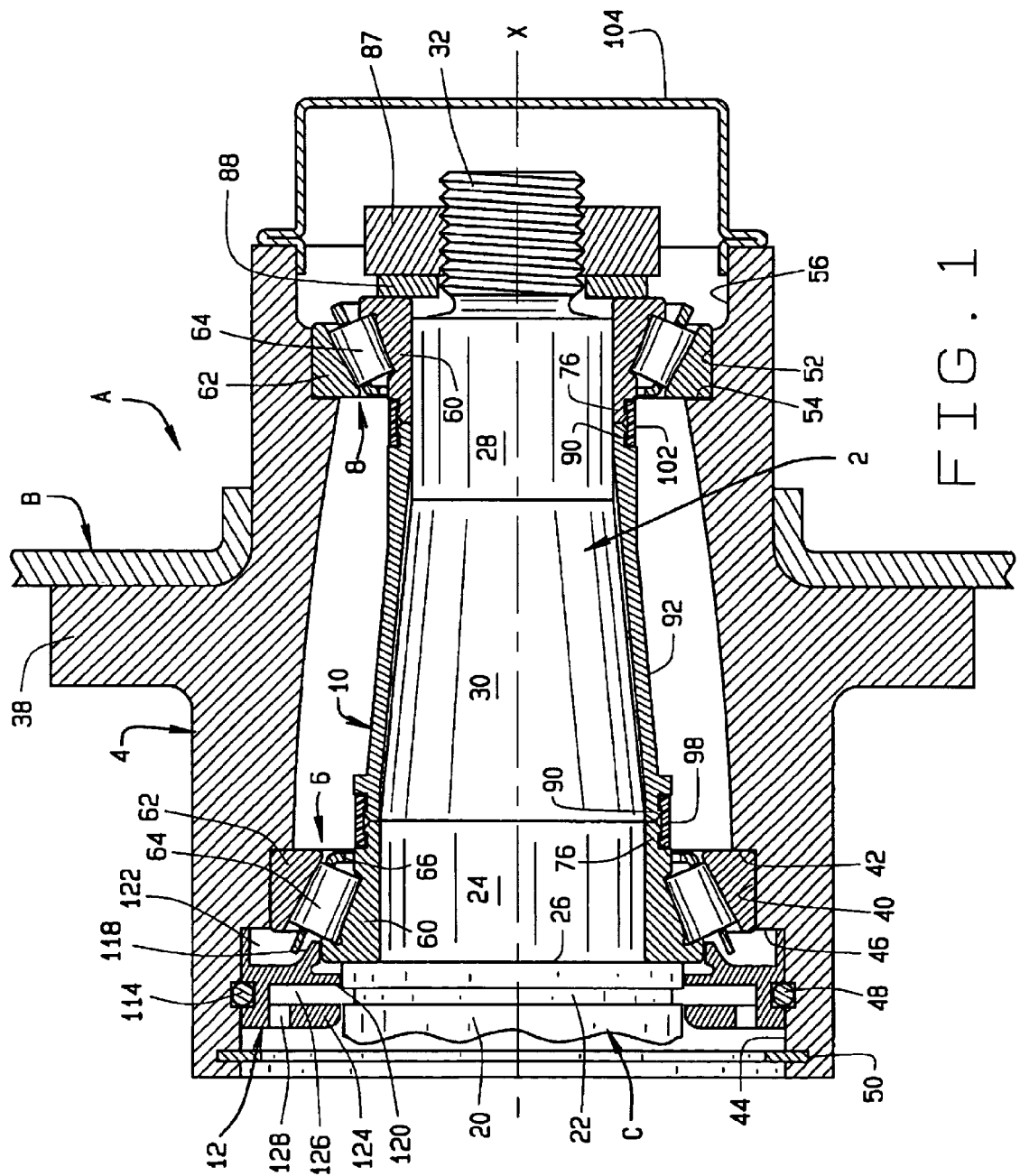
FIG. 1 is a longitudinal sectional view of a wheel mounting constructed in accordance with and embodying the present invention.

Referring now to the drawings, a wheel mounting A (FIG. 1) serves to couple a road wheel B to the suspension system C of an automotive vehicle. It enables the wheel W to rotate on the suspension system C with a good measure of stability, so that the wheel B does not wobble, and with minimal friction. Of course, the mounting A transfers radial as well as axial thrust loads between the suspension system component C and the wheel B. Basically, the wheel mounting A includes a spindle 2, a hub 4 located around the spindle 2, inboard and outboard bearings 6 and 8 in the annular space between the spindle 2 and hub 4, a spacer 10 between the bearings 6 and 8, and a seal 12 between the spindle 2 and the hub 4 beyond the inboard bearing 6. The wheel B is attached to the hub 4. The spindle 2 forms an extremity of the suspension system C.

Considering the spindle 2 in more detail, it has a cylindrical sealing surface 20 out of which a groove 22 opens. The groove 22 may have a rectangular profile which provides it with distinct corners or it may have an arcuate profile. The sealing surface 20 leads up to a cylindrical inboard bearing seat 24 of lesser diameter, there being a shoulder 26 between the surface 20 and the seat 24. The spindle 2 also has a cylindrical outboard bearing seat 28 of even less diameter and a tapered intervening surface 30 between the two bearing seats 24 and 28. The outboard bearing seat 28 leads out to a threaded end 32 of still smaller diameter.

The hub 4 encircles the spindle 2, and for the most part is tubular, but it does have a flange 38 to which the road wheel B is attached and perhaps a brake disk as well. Within its interior, at its inboard end, the hub has a bore 40 that leads away from a shoulder 42 and opens into a counterbore 44 at another shoulder 46. It also has a shallow groove 48 that opens out of the surface of the counterbore 44 and a deeper groove 50 that otherwise opens out of the surface of the counterbore 44, the former being closer to the shoulder 46 than the latter. At its outboard end the hub 4 has another bore 52 that leads away from a shoulder 54 and opens into a counterbore 56 that opens out of the outboard end.

Each of the bearings 6 and 8 includes (FIGS. 2 and 3) an inner race in the form of a cone 60, an outer race in the form of a cup 62 which surrounds the cone 66, and rolling elements in the form of tapered rollers 64 arranged in a single row between the cone 60 and the cup 62. In addition, each bearing 6 and 8 has a cage 66, also located between the cone 60 and cup 62 and within the row of rollers 64, to maintain a uniform spacing between the rollers 64.

The cone 60 has a tapered raceway 68 which is presented outwardly away from the axis X. It leads up to a thrust rib 70 having an outwardly presented surface 71 that is cylindrical and a back face 72 at one end of the surface 71 and a slightly conical rib face 73 at the other end of the surface 71. The surface 71 for the cone 60 of the bearing 6 lies adjacent to the sealing surface 20 on the spindle 2, but at a greater diameter, and likewise serves as a sealing surface. The back face 72 is squared off with respect to the axis X. The rib face 73 lies at the large end of the cone raceway 68. At its small end the raceway 68 terminates at a retaining rib 74. Beyond the retaining rib 74, the cone 60 has a coupling extension 76 that extends axially and is provided with (FIGS. 2 and 3) a groove 78 that opens outwardly away from the axis X. Beyond the groove 78 at the very end of the cone 60, the extension 76 has a chamfer 80 that leads up to the groove 78.

The cup 62 surrounds the cone 60 and has a tapered raceway 82 that is presented inwardly toward the axis X and toward the raceway 68 on the cone 60. At the small end of its raceway 82 the cup 62 has a back face 84 that is squared off with respect to the axis X.

The tapered rollers 64 lie in a circular row between the raceways 68 and 82 of the cone 60 and cup 62, respectively. Each roller 64 has a tapered side face 85 where the roller 64 contacts the raceways 68 and 82, there being essentially line contacts between the side face 85 and the raceways 68 and 82. Each roller 64 also has a large end face 86 where it bears against the thrust rib 70 of the cone 60, so the thrust rib 70 prevents the roller 64 from moving up the raceways 68 and 82 and being expelled from the bearing 6 or 8. The cage 66 rides on the rollers 64 beyond their centers and maintains a uniform spacing between the rollers 64. The rollers 64 are generally on apex, meaning that the conical envelopes in which the mean of their tapered side faces lie have their apices at a common point along the axis X. Of course, the mean of the envelopes for the raceways 68 and 82 have their apices at the same point as well.

Actually, the raceways 68 and 82 of the cone 60 and cup 62, respectively, and the side faces 85 of the rollers 64 deviate slightly from being purely conical. Preferably, the raceways 68 and 82 and the side faces 85 of the rollers 64 are profiled generally in accordance with the teachings U.S. patent application Ser. No. 091/853,529, filed May 11, 2001, for the invention f M. Joki entitled Bearing with Low Wear and Power Loss Characteristics (now U.S. Pat. No. 6,502, 996,), which application is incorporated herein by reference. Moreover, the large end faces 86 of the rollers 64 contact the thrust rib 70 at a minimal distance from the cone raceway 68 as also taught by U.S. patent application Ser. No. 09/853, 529.

The cone 60 for the inboard bearing 6 fits over the inboard seat 24 on the spindle 2 with its backface 72 against the shoulder 26 at the end of that seat 24, there being a loose fit no greater than about 0.003 in. (diameter) between the cone 60 and the seat 24. The cup 62 for the inboard bearing 6 fits into the inboard bore 40 in the hub 4 with an interference fit, its back face 84 being against the shoulder 42 at the end of the bore 40.

The cone 60 of the outboard bearing 8 fits over the outboard bearing seat 28 on the spindle 2 with its back face 72 presented toward the threaded end 32. Again a slightly loose fit no greater than about 0.003 in. (diameter) exists between the cone 60 and the seat 28. The cup 62 of the outboard bearing 68 fits into the outboard bore 52 of the hub 6 with an interference fit, its back face 72 being against the shoulder 54 at the end of the bore 52. The two bearings 6 and 8 are maintained on the spindle 2 by a nut 87 (FIG. 1) which threads over the threaded end 32 and, through a washer 88, bears against the back face 72 of the outboard cone 60.

Each bearing 6 and 8 will transfer a radial load from the spindle 2 to the hub 4, and that load includes the weight of the vehicle together with inertial loads. Each bearing 6 and 8 also transmits an axial or thrust load in the direction that seats its rollers 64 against the raceways 68 and 82 on its cone 60 and cup 62. Since the bearings 6 and 8 are mounted in opposition, they confine the hub 4 axially on the bearing 2 and transfer axial loads in both directions. Indeed, the axial loads taken by each bearing 6 and 8 transfer through the back faces 72 and 84 of its cone 60 and cup 62.

Figure 2:
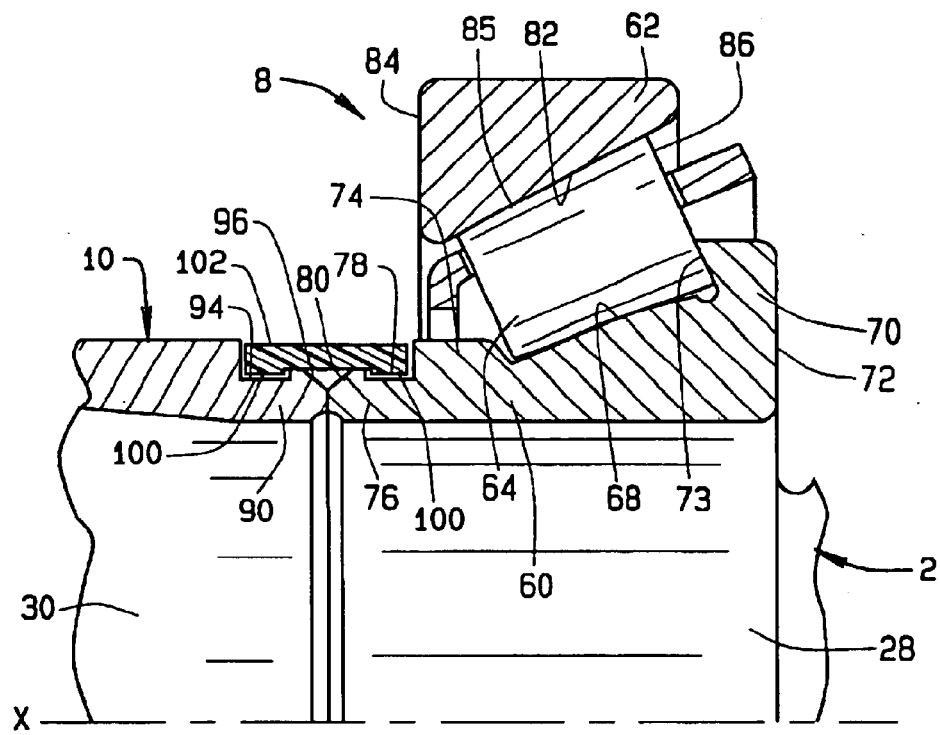
FIG. 2 is a fragmentary sectional view, enlarged, of one of the retaining rings and coupling extensions that it engages.
Figure 3:
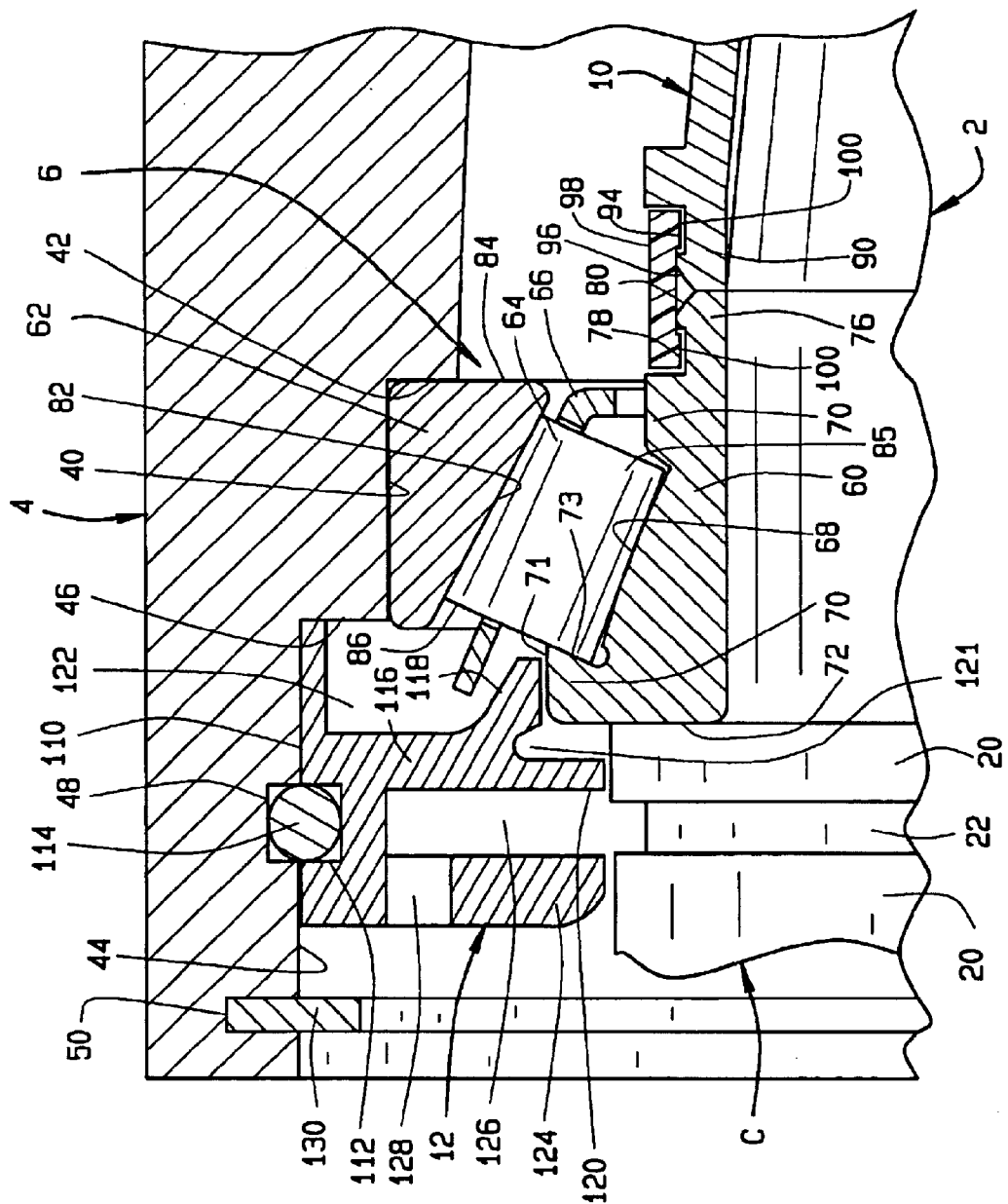
FIG. 3 is fragmentary sectional view, enlarged, at the seal and adjacent bearing forming part of the mounting.

While the nut 87 holds the two bearings 6 and 8 together in the sense that it prevents their cones 60 from separating, it does not establish the setting of the bearings 6 and 8. The spacer 10 does that, in that it controls the spacing between the two cones 60. The spacer 10 fits around the spindle 2 basically at the intervening surface 30 between the two bearing seats 24 and 28 (FIG. 1). It has at each of its ends a coupling extension 90 of generally cylindrical configuration and between the two extensions a tapered region 92. Each extension 90 has (FIGS. 2 and 3) a groove 94 which opens outwardly away from the axis X and a chamfer 96 leading up to the groove 94. The extension 90 at the large end of the spacer 10 aligns with the extension 76 on the cone 60 of the inboard bearing 6 (FIG. 3). Here a large retaining ring 98 encircles the two extensions 76 and 90, it having ribs 100 which project into the grooves 78 and 94 in the extensions 76 and 90 to prevent the spacer 10 from separating from the inboard cone 60. The extension 90 at the small end of the spacer 10 aligns with the extension 76 on the cone 60 of the outboard bearing 8 (FIG. 2). Here a small retaining ring 102 overlies the two extensions 76 and 90. It too has ribs 100 which project into the grooves 78 and 94 of the extensions 76 and 90 to prevent the outboard cone 60 and spacer 10 from separating. The two rings 98 and 102 are preferably formed from a polymer and should be capable of expanding elastically to enable the ribs 100 to ride up the chamfers 80 and 96 on the extensions 76 and 90 and then snap into the grooves 78 and 94, all without fracturing or undergoing plastic deformation. Thus, the spacer 10 together with the retaining rings 98 and 102 hold the two bearings 6 and 8 together within the hub 4 when the hub 6 is removed from the spindle 2, so the hub 4 and bearings 6 and 8 and the seal 12 as well may be furnished as a package which may be installed quickly and easily over the spindle 2.

Considering the bearings 6 and 8 in more detail, each in outward appearance somewhat resembles any single row tapered roller bearing of conventional design. But differences exist, and these differences enable the bearings 6 and 8 to operate with less torque and less wear. As a consequence, the bearings 6 and 8 consume less power than a traditional single row tapered roller bearings of equivalent size and have greater lifespans.

In contrast to conventional bearings, each bearing 6 and 8 has the raceways 68 and 82 of its cone 60 and cup 62 highly profiled and the same holds true for the side faces 85 of its rollers 64. In short, the raceways 68 and 82 and the roller side faces 85 are crowned. To be sure, conventional tapered roller bearings have their raceways and roller side faces profiled to minimize stresses at the ends of the rollers, but the profiling results in typically less than 500 µin. of relief per inch of contact length. In each of the bearings 6 and 8 the relief exceeds 800 µin. per inch per inch of contact at both ends of each roller 64 along the cone raceway 68 and likewise exceeds 800 µin. per inch of contact at both ends of each roller 64 along the cup raceway 82. This reduces the stiffness of the bearings 6 and 8 at light loads, but also causes the rollers 64 to plow or churn less of the lubricant at light loads, because the rollers side faces 85 near their ends are separated from the raceways 68 and 82 sufficiently to avoid excessive churning of the lubricant. However, heavier loads, which are normally transient, diminish the crowning and give the bearings 6 and 8 greater stability.

High asperities in contacting surfaces of a bearing penetrate the hydrodynamic lubricant film, so the surface finish should have a low average roughness, and this holds particularly true along the rib face 73 and the large end faces 86 of the rollers 64 where the contact between those faces is characterized by sliding and spinning. When high asperities exist along the rib faces and roller end faces, metal-to-metal contact occurs which increases torque at low speed and produces high temperatures as well. In the bearings 6 and 8, the arithmetic average roughness of the rib faces 73 and of the end faces 86 on the rollers 64 is 4 $\mu$in. or less. This low surface roughness preserves the hydrodynamic lubricant film along the rib face 73 and reduces torque.

Figure 4:
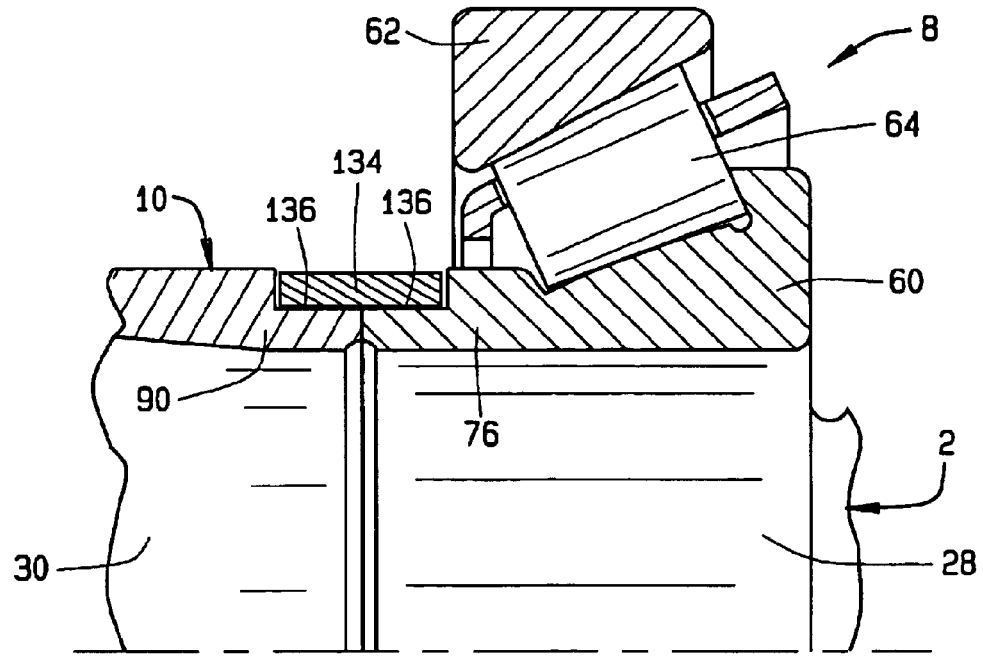
FIG. 4 is a fragmentary sectional view of a modified retaining ring and the coupling extensions that it engages.

Typically, the rollers for a taper roller wheel bearing contact the rib face about 0.04 in. 0.06 in. above the cone raceway at the rib face. This creates a relatively large moment arm between the elliptical region of contact and the cone raceway, and as the roller rolls along the cone raceway it must overcome the torque generated by the frictional force along the rib face acting through the relatively long moment arm. The torque consumes power that increases operating temperature. In the cone 60 of each bearing 6 and 8, the center of elliptical region of contact between the large end face 86 of any roller 64 and the conical rib face 73 lies a distance between 0.02 in. and 0.04 in. radially beyond the intersection of the envelopes for the cone raceway 68 and the conical rib face 73 (FIG. 4). This reduces the torque required to rotate the rollers 64 against the friction along the rib face 73 and thus reduces the torque required to rotate the bearings 6 and 8.

To install the bearings 6 and 8 within the hub 4, the cup 62 of the inboard bearing 6 is pressed into the inboard bore 40 until its back face 84 seats against the shoulder 42 at the end of the 40. Likewise, the cup 62 of the outboard bearing 8 is pressed into the inboard bore 52 until its back face 84 seats against the shoulder 54 at the end of that bore 52. Then the cones 60 for the two bearings 6 and 8, each surrounded by its complement of rollers 64 and its cage 66, are inserted into the cups 62 and rotated to insure that the rollers 64 seat properly against the raceways 68 and 82 and against the thrust ribs 70. While a light force is maintained against the back faces 72 on the two cones 60 to insure that the rollers 64 remain seated, the spacing between the opposite ends of the cones 60, that is between end faces of the coupling extensions 76, is measured. The distance measured represents the length of a spacer 10 which will set the bearings 6 and 8 to a condition of essentially zero endplay (no endplay, no preload). But preferably the bearings 6 and 8 operate under a slight preload. Accordingly the amount of preload in terms of a lineal dimension is subtracted from the distance measured, and the spacer 10 is ground so that its length corresponds to the length so calculated. Thereupon, the spacer 10 is placed within the hub along with the two cones 60 and the retaining rings 98 and 102. In this condition, the large retaining ring 98 bears against the chamfer 80 on the extension 76 for the cone 60 of the inboard bearing 6 and also against the chamfer 96 on the extension 90 at the large end of the spacer 10. The small retaining ring 102 bears against the chamfer 80 on the extension 76 for the outboard cone 60 and also against the chamfer 96 on the extension 90 at the small end of the spacer 10. With the cones 60, spacer 10 and retaining rings 98 and 102 so aligned, the two cones 60 are urged together. The retaining rings 98 ride up the chamfers 80 and 96 on the cones 60 and spacer 10 and their ribs 100 snap into the grooves 78 on the cone extensions 76 and the grooves 94 in the spacer extensions 90, all without fracturing or undergoing plastic deformation. The retaining rings 98 and 102 thus engage the cones 60 and spacer 10, and unify them, at least for purposes of handling.

However, the rings 98 and 102 will yield under sufficient axial force, and this permits disassembly of the bearing 6 and 8 for inspection, all without damaging the spacer 10. The rings 98 and 102 for the disassembled bearings 98 and 102 are discarded and replaced with new rings 98 and 102 upon reassembly of the bearings 6 and 8 and spacer 10 within the hub 4.

The bearings 6 and 8 are lubricated with a grease which must remain within the vicinity of the raceways 68 and 82, the thrust rib 70, and, of course, the rollers 64, and further must remain free of contaminants such as water and dirt. At the outboard end of the mounting A, a cover 104 (FIG. 1) is pressed into the counterbore 56 of the hub 4 to retain the grease for the outboard bearing 8 and to exclude contaminants. The seal 12 retains the grease for the inboard bearing 8 and excludes contaminants from that grease.

The seal 12 is preferably machined or otherwise formed from a substance, such as aluminum, which is light in weight and dimensionally stable. Some polymers will suffice as well. Irrespective of the material, the seal 12 establishes a static fluid barrier with the hub 4 with which it rotates and a dynamic fluid barrier along the spindle 2 and inboard cone 60. The dynamic fluid barrier is characterized by the absence of friction.

More specifically the seal 12 has (FIG. 3) an exterior surface 110 which is only slightly smaller in diameter than the counterbore 44 at the inboard end of the hub 4. Indeed, the seal 12 fits into the counterbore 44 with its one end against the shoulder 46 at the end of the counterbore 44. The seal 12 contains a groove 112 which opens out of the exterior surface 110 and aligns with the shallow groove 48 that opens into the counterbore 44. Here the seal 12 is provided with an O-ring seal element 114 that is formed from an elastomer. The seal element 114 occupies the two grooves 48 and 112 where it exists in a state of compression. As such it creates a static fluid barrier between the hub 4 and the seal 14 and further serves to center the seal 14 in the counterbore 44. On the inner side of the groove 112 the seal 12 has an inwardly directed rib 116 which spreads into an inner barrier lip 118 and an intermediate barrier lip 120 with an undercut 121 being between the two lips 118 and 120. The inner lip 118 flairs axially toward the inboard bearing 6 and surrounds the sealing surface 71 on the thrust rib 70 of the inboard cone 60. As such, it creates an annular grease chamber 122 with the region of the seal 12 that lies outwardly from it, and that grease chamber 122 opens toward the large end faces on the rollers 64 of the inboard bearing 6. A clearance of between 0.005 and 0.010 in. (diameter) exists between the inner lip 118 and the sealing surface 71 of the thrust rib 70.

The intermediate lip 120 projects toward and surrounds that portion of the sealing surface 20 that lies between the groove 22 and the shoulder 26 on the spindle 2. A clearance of between 0.005 and 0.020 in. (diameter) exists between the lips 120 and the sealing surface 20. At its outer end, the seal 12 has an outer lip 124 which projects inwardly toward and terminates close to the sealing surface 20 on the other side of the groove 22. Again, a clearance of between 0.005 and 0.020 in. (diameter) exists between the lip 124 and the sealing surface 20. Between its intermediate lip 120 and outer lip 124, the seal contains an annular chamber 126 which aligns with and opens into the groove 22 in the spindle 2. The outer lip 124 contains axially directed holes 128 which open out of the annular chamber 126 at its base and also open out of the outer end of the seal 12 and into the open end of the counterbore 44. While the O-ring seal element 114 retains the seal 12 in place axially within the counterbore 44, the deep groove 50 that also opens into the counterbore 44 contains a snap ring 130 that provides an extra measure security against displacement of the seal 12.

The bearings 6 and 8, when set into operation, should contain the proper amount of grease. With too little grease, the bearings 6 and 8 will develop excessive friction. Too much grease will cause the cage 66 of the over-lubricated bearings 6 or 8 to drag on the excess grease as well as reject the grease past the lips 118, 120 and 124 of the seal 12. Upon assembly of the wheel mounting A, the grease should be placed between the rollers 64 and under the cage 66, with any excess being placed under the small end ring of the cage 66. The optimum amount of grease for the inboard bearing 6 is equal to between 10 and 20% of the volume between the cone 60 and cup 62 in which the rollers 64 of the bearing 6 travel and preferably 13% of that volume plus between 50 and 100% of the volume of the grease chamber 122 and preferably 70%. The outboard bearing 8 should be filled or provided with a quantity of grease between one and three times, and preferably two times, the volume between the cone 60 and cup 62 in which the rollers 64 of the bearing 8 travel.

In operation, the mounting A enables the road wheel B to rotate relative to the suspension system C with minimal friction and considerable stability. It is therefore well-suited for the road wheels of race cars. The two bearings 6 and 8, of course, facilitate the rotation. They transfer radial loads as well as axial loads in both directions between the suspension system C and the road wheel B. Their setting derives from the spacer 10 and is not controlled by the nut 86 that is turned down over the-threaded end 32 of the spindle 2. The grease reduces internal friction within the bearing 6 and 8 to a minimum, yet is not so plentiful as to cause produce a significant drag.

Since the cover 104 closes the outboard end of the hub 4, contaminants cannot enter the hub 4 at that location, nor can the grease escape. At the inboard end of the hub 4, the seal 12 serves the same purpose. It creates a dynamic seal barriers with the inboard cone 60 and spindle 2—yet barriers that are devoid of friction, so as not to impede the rotation of the hub 4.

The inner lip 118 of the seal 12 and the intermediate lip 120, as well, resist the expulsion of grease from the inboard bearing 6. Since the inner lip 118 operates at a diameter somewhat greater than the intermediate lip 120, the grease that migrates past the gap between the inner lip 118 and the thrust rib 70 of the inboard cone 60 must then migrate radially inwardly to reach the gap between the intermediate lip 120 and the sealing surface 20. The centrifugal forces generated by the rotation of the hub 4 oppose the inward migration. Any grease that escapes through the gap between the inner lip 118 and the thrust rib 70 tends to collect in the undercut 121. Actually, most of the grease which is pumped or otherwise displaced from the space between the raceways 68 and 82 of the inboard bearing 6 encounters the outer flared surface on the inboard lip 118, and this surface leads into the grease chamber 122. Indeed, the centrifugal forces generated by the rotating hub 4 advance the grease along that inclined surface, so that if anything, the grease accumulates in the chamber 122 opposite the large ends of the rollers 64—and the large end faces 86 of the rollers 64 need it most, inasmuch as they slip and spin along the face 73 of the that rib 70 and represent the source of greatest friction in the bearing 6.

Water which migrates along the spindle 2 toward the inboard bearing 6 is to a measure excluded by the outer lip 124, but any water which passes through the gap between the outer lip 124 and the sealing surface 20 encounters the groove 22 in the spindle 2. If the hub 4 is at rest, the water drains to the bottom of the groove 22, drips into the lowermost region of the annular chamber 126 in the seal 12, and drains from the seal 12 through the lowermost of the axial holes 128. On the other hand, if the hub 4 is rotating, the water will still enter the annular chamber 126, either by draining into it at the bottom of the groove 22 or by being caught up on the rotating surfaces of the outer lip 124 and flung outwardly into the chamber 126. In either event, the centrifugal force imparted to the water by the rotating seal 12 drives the water to the base of the annular chamber 126 where it escapes through the axial holes 128.

The retaining rings 98 and 102 need not interlock with the coupling extensions 76 and 90 on the cones 60 and spacer 10. Instead, they may be simple collars 134 (FIG. 4) having uniform diameters on their interiors. To accommodate such collars 134, the extensions 76 and 90 merely have cylindrical surfaces 136 that lead out to their ends. The collars 134 along their inside surfaces are slightly smaller than the cylindrical surfaces 136 of the extensions 76 and 90 and fit over the surfaces 136 with interference fits, but the interference fits are not heavy enough to cause a plastic deformation of the collars 130. Friction between the collars 134 and cylindrical surfaces 136 engages the cones 60 with the spacer 10 and holds them together.

The bearings 6 and 8 need not be tapered roller bearings, but instead may be bearings of other configurations that accommodate both radial and axial loads, such as angular contact ball bearings. Also the cups 62 or outer races of the bearings 6 and 8 need not be separate components, but instead may be formed on a single race inserted into the hub 4 or even integral with the hub 4, in which event the outer raceways 82, whether they are tapered or in some other configuration, are formed directly on the hub 4.

What is claimed is:

1. A mounting for a vehicular road wheel which rotates about an axis, said mounting comprising:

a spindle;

a hub located around the spindle;

inboard and outboard bearings located between the hub and the spindle, each bearing including a raceway carried by the hub where it is presented inwardly toward the axis, an inner race located around the spindle and having a raceway that is presented outwardly away from the axis and toward the raceway in the hub, and rolling elements located in a row between the raceways, the raceways of the inboard bearing being inclined downwardly toward the outboard bearing and the raceways of the outboard bearing being inclined downwardly toward the inboard bearing, whereby the bearings are mounted in opposition to carry radial loads and axial loads in both directions;

a spacer located around the spindle and between the inner races to establish the spacing between the inner races and for imparting the proper setting to the bearings, the spacer being engaged with the inner races so that the inner races and spacer are unitized within the hub; and a seal located between the hub and the spindle beyond the inboard bearing.

2. A mounting according to claim 1 wherein the inner races of the bearings and the spacer are detachably connected.

3. A mounting according to claim 2 wherein the ends of the spacer abut the ends of the inner races, and further comprising retaining rings fitted around the abutting ends of the spacer and inner races to prevent the inner races from separating from the spacer.

4. A mounting according to claim 3 wherein each inner race has a back face at one end and a coupling extension at its other end; wherein the spacer has coupling extensions at both ends; and wherein the retaining rings encircle the coupling extensions on the inner races and spacer and attach the inner races to the spacer.

5. A mounting according to claim 4 wherein the coupling extensions on the inner races and spacer have grooves which open away from the axis; and the retaining rings have ribs which project into the grooves in the coupling extensions and interlock the rings with the coupling extensions.

6. A mounting according to claim 5 wherein the coupling extensions on the inner races and spacer have chamfers at their ends to expand the rings when the rings are forced against the ends of the extensions.

7. A mounting according to claim 1 wherein the spindle has a sealing surface which is located adjacent to the inner race of the inboard bearing; and wherein the seal effects a static fluid barrier with the hub and a dynamic fluid barrier with the sealing surface on the spindle without contacting the spindle.

8. A mounting according to claim 7 wherein the seal also effects a dynamic fluid barrier with the inner race of the inboard bearing without contacting that inner race.

9. A mounting according to claims 7 wherein the inner race of the inboard bearing has a sealing surface located radially beyond the sealing surface on the spindle; and wherein the seal is carried by the hub and has a first lip which projects toward and forms a dynamic fluid barrier with the sealing surface on the inner race of the inboard bearing without contacting that sealing surface and a second lip which projects toward and forms a dynamic fluid barrier with the sealing surface on the spindle without contacting that sealing surface.

10. A mounting according to claim 9 wherein the seal has a third lip which is spaced axially from the second lip and projects toward the sealing surface of the spindle to form another dynamic fluid barrier with that sealing surface, there being an annular chamber between the second and third lips, with the chamber opening radially inwardly toward the axis.

11. A mounting according to claim 10 wherein the spindle has an annular groove which opens out of its sealing surface and generally aligns with the annular chamber between the second and third lips of the seal.

12. A mounting according to claim 11 wherein the seal has a grease chamber which surrounds the first lip and opens toward the rolling elements of the inboard bearing; wherein the seal also has an undercut between the first and second lips; and wherein the third lip of the seal has holes which lead away from the radially outermost region of the annular chamber that is between the second and third lips.

13. A mounting for a road wheel which rotates about an axis, said mounting comprising:
a spindle having a sealing surface, an inboard bearing seat, an outboard bearing seat and a threaded end organized in that order;
a hub located around the spindle;
an inboard bearing including a tapered outer raceway carried by the hub, an inboard cone located around the inboard bearing seat on the spindle and having a tapered inner raceway presented outwardly toward the tapered outer raceway and coupling extension projecting axially beyond the small end of the inner raceway, and tapered rollers arranged in a row between the outer and inner raceways, the raceways of the inner bearing tapering downwardly away from the sealing surface of the spindle;
an outboard bearing including a tapered outer raceway carried by the hub, an outboard cone located around the outboard seat and having a tapered inner raceway that is presented toward the outer raceway and a coupling extension projecting axially beyond the small end of the inner raceway, and tapered rollers arranged in a row between the outer and inner raceways, the raceways of the outboard bearing tapering downwardly away from the threaded end of the spindle;
a spacer located around the spindle and between the cones of the inboard and outboard bearings, the spacer having coupling extensions where it abuts the coupling extensions on the cones for the bearings, the spacer establishing the setting for the bearings;
a nut engaged with the threaded end of the spindle to retain the cones of the bearings on the spindle; and
a seal carried by the hub and establishing dynamic fluid barriers with the cone of the inboard bearing and with the sealing surface of the spindle, all without contacting the cone or the sealing surface.

14. A mounting according to claim 13 wherein the cone of the inboard bearing has a thrust rib having a sealing surface of greater diameter than the diameter of the sealing surface on the spindle; and wherein the seal has a first lip which projects toward, but does not contact the sealing surface of the thrust rib and a second lip which projects toward but does not contact the sealing surface of the spindle.

15. A mounting according to claim 14 wherein the seal has a third lip which projects toward but does not contact the sealing surface of the spindle and is located beyond the second lip such that the second lip is interposed between the first and third lips; and wherein an annular chamber exists between the second and third lips and the third lip has drain holes at the base of the annular chamber.

16. A mounting according to claim 15 wherein the spindle has a groove which opens out of the sealing surface and generally aligns with the annular chamber in the seal.

17. A mounting according to claim 14 wherein the first lip extends obliquely with respect to the axis toward the thrust rib of the cone for the inboard bearing; and the seal contains a grease chamber that is located generally around the oblique first lip and opens toward the large ends of the tapered rollers for the inboard bearing.

18. A mounting for enabling a road wheel to rotate about an axis, said mounting comprising:
a spindle having a sealing surface presented away from the axis;
a hub located around the spindle;
an antifriction bearing located between the spindle and hub for enabling the hub to rotate on the spindle about the axis, the bearing including an inner race having a sealing surface that is located radially outwardly from sealing surface of the spindle; and
a seal carried by hub and having a first lip which projects toward the sealing surface on the inner race of the bearing without contacting that sealing surface, the seal also having a second lip which projects toward the sealing surface on the spindle without contacting that sealing surface, all to establish dynamic fluid barriers along the sealing surfaces.

19. A mounting according to claim 18 wherein an undercut exists between the first and second lips, with the greatest diameter of the undercut being greater than the diameters of either of the sealing surfaces.

20. A mounting according to claim 18 wherein the bearing has an inner raceway on its inner race and also a thrust rib, with the sealing surface of the inner race being on the thrust rib, an outer raceway carried by the hub, and tapered rollers arranged in a row between the inner and outer raceways; wherein the first lip of the seal extends obliquely with respect to the axis toward the sealing surface on the thrust rib; and wherein the seal has a grease cavity located around the oblique first lip, with the cavity opening toward the ends of the tapered rollers.

21. A mounting according to claim 20 and further comprising grease lubricating the bearing, with the volume of the grease amounting to between 10% and 20% of the volume between the raceways plus between 50% and 100% of the volume of the grease cavity.

22. A mounting according to claim 18 wherein the seal has a third lip which projects toward the sealing surface on the spindle and establishes a dynamic fluid barrier with that surface without contacting that surface; and wherein the second lip is interposed between the first and third lips and an annular chamber exists between the second and third lips.

23. A mounting according to claim 22 wherein the spindle contains a groove which opens out of its sealing surface and aligns with the annular chamber between the second and third lips of the seal.

24. A mounting according to claim 22 wherein the third lip contains holes which open out the annular chamber at the base of the chamber.

25. A mounting for a road wheel which rotates about an axis, said mounting comprising:

a spindle having an inboard bearing seat and an outboard bearing seat;

a hub located around the spindle;

an inboard bearing including a tapered outer raceway carried by the hub, an inboard cone located around the inboard bearing seat on the spindle and having a tapered inner raceway presented outwardly toward the tapered outer raceway, and tapered rollers arranged in a row between the outer and inner raceways, the raceways of the inner bearing tapering downwardly toward the outboard bearing seat;

an outboard bearing including a tapered outer raceway carried by the hub, an outboard cone located around the outboard bearing seat and having a tapered inner raceway that is presented toward the outer raceway; and tapered rollers arranged in a row between the outer and inner raceways, the raceways of the outboard bearing tapering downwardly toward the inboard bearing seat; and a seal carried by the hub an establishing a dynamic fluid barrier beyond the rollers of the inboard bearing;

the raceways and the rollers of at least one of the bearings being profiled such that they crowned, with the profiling at the outer raceway exceeding 800 μin. per inch.

26. A mounting according to claim 25 wherein the inboard bearing has a thrust rib provided with a sealing surface that is presented away from the axis; and wherein the seal has a first lip which projects toward, but does not contact the sealing surface of the thrust rib.

27. A mounting according to claim 26 wherein the first lip defines in part a grease chamber that opens toward the large ends of the rollers for the inboard bearing.

28. A mounting according to claim 27 and further comprising grease for the inboard bearing, with the amount of grease being between 10% and 20% of the volume of the annular space between the cone and the cup plus between 50% and 100% of the volume of the grease chamber.

29. A mounting according to claim 26 wherein the spindle has a sealing surface located beyond the inboard bearing and the seal has a second lip which establishes a dynamic fluid barrier along the sealing surface of the spindle without contacting that sealing surface.

30. A mounting according to claim 29 wherein the diameter of the sealing surface on the thrust rib for the inboard bearing exceeds the diameter of the sealing surface on the spindle.

31. A mounting according to claim 25 and further comprising grease at the outboard bearing, with the volume of grease being between one and three times the volume of the annular space between the cone and the cup of the outboard bearing.

32. A mounting according to claim 25 wherein each bearing on its cone has a thrust rib against which the large end faces of the rollers bear, and the center of contact between the large end faces of tapered rollers and the rib on the cone is between 0.02 in. and 0.04 in. from the conical envelope formed by the raceway of the cone.

33. A mounting according to claim 25 wherein each bearing on its cone has a thrust rib against which the large end faces of the rollers bear, and the arithmetic average roughness of the faces of the thrust rib on the cone and the large end faces of the tapered rollers which contact that face is 4 μin. or less.

* * * * *

UNITED STATES PATENT AND TRADEMARK OFFICE
CERTIFICATE OF CORRECTION

PATENT NO. : 6,786,645 B2
DATED : September 7, 2004
INVENTOR(S) : Mark A. Joki et al.

It is certified that error appears in the above-identified patent and that said Letters Patent is hereby corrected as shown below:

Title page,
Item [75], Inventor, replace "Steven B. Boyd" with -- Steven V. Boyd --

Column 3,
Line 42, replace "091853,529" with -- 09/853,529 --

Signed and Sealed this

Twelfth Day of April, 2005

JON W. DUDAS
*Director of the United States Patent and Trademark Office*